United States Patent [19]

Trahan et al.

[11] Patent Number: 4,836,839
[45] Date of Patent: Jun. 6, 1989

[54] PLUNGER ASSEMBLY FOR A GLASSWARE FORMING MACHINE

[75] Inventors: Albert J. Trahan, Vernon; Robert J. Douglas, North Granby, both of Conn.

[73] Assignee: Emhart Industries, Inc., Farmington, Conn.

[21] Appl. No.: 207,360

[22] Filed: Jun. 15, 1988

[51] Int. Cl.⁴ .......................... C03B 11/10; C03B 11/12
[52] U.S. Cl. .......................................... 65/323; 65/319; 65/362
[58] Field of Search .................. 65/305, 319, 323, 362, 65/307

[56] References Cited

U.S. PATENT DOCUMENTS

| 3,607,206 | 9/1971 | Foster | 65/323 |
| 4,272,273 | 6/1981 | Trahan et al. | 65/323 |
| 4,636,240 | 1/1987 | Kozora | 65/362 |

Primary Examiner—Joye Woodard
Attorney, Agent, or Firm—Spencer T. Smith

[57] ABSTRACT

The casing for a cylinder in an I.S. glassware forming machine is displaced with the kick-up basket and strikes the neck ring assembly in the event there is any misalignment therebetween. The plunger holder and a float cover move laterally as one due to float clearances defined between the float cover and the top cap of the spring retainer, and between the plunger holder and the adapter assembly, and between the cooling tube, which is connected to the plunger, and the bore of the locking bolt which secures the adapter assembly to the piston.

3 Claims, 6 Drawing Sheets

PLUNGER ASSEMBLY FOR A GLASSWARE FORMING MACHINE

BACKGROUND OF THE INVENTION

The present invention relates to individual section glassware forming machines which form glassware in the press and blow process, and more particularly, to the plunger mechanism of such machines which presses a molten gob of glass into a parison or preform. A plunger mechanism is disclosed in U.S. Pat. Nos. 4,272,273 and 4,636,240.

Each section of an I.S. machine has one or more plunger mechanisms, i.e. one in a single gob machine, two in a double gob machine, three in a triple gob machine and four in a quad gob machine, etc., and it is difficult to maintain the desired precise alignment of the individual plunger mechanisms with the associated molds.

SUMMARY OF THE INVENTION

It is accordingly an object of the present invention to provide a plunger mechanism which includes a positioner for automatically defining, without any resistance, the desired precise alignment between the plunger of the plunger mechanism and its associated mold.

Other objects and advantages of the present invention will become apparent from the following portion of this specification and from the accompanying drawings which illustrate in accordance with the mandate of the patent statutes, a presently preferred embodiment incorporating the principles of the invention.

DESCRIPTION OF THE PREFERRED EMBODIMENT

Figure 2:
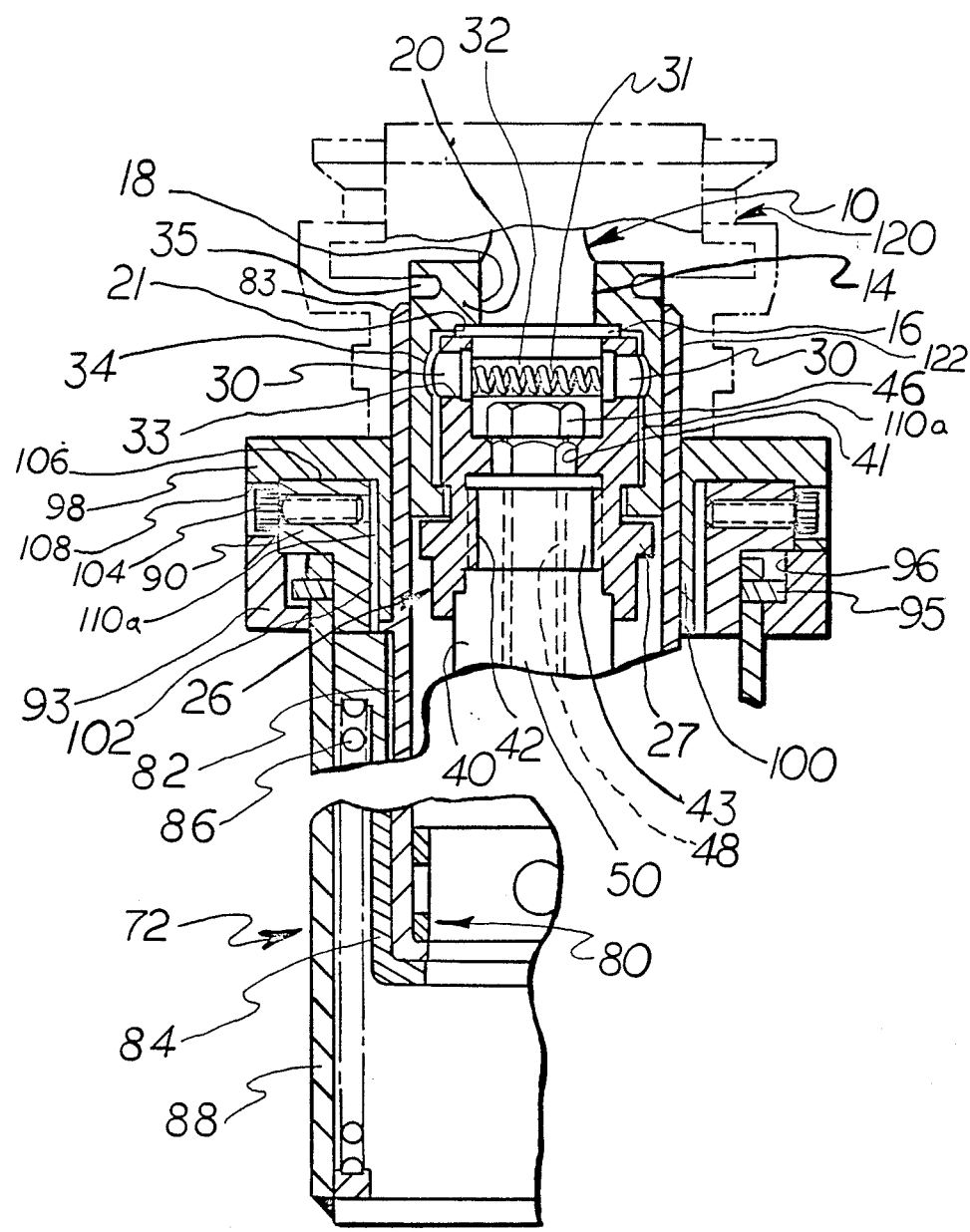
FIG. 2 is an axial cross-sectional view of the adapter assembly mounting the plunger to the vertically reciprocating piston of one of the cylinders in an individual section forming machine.
Figure 3:
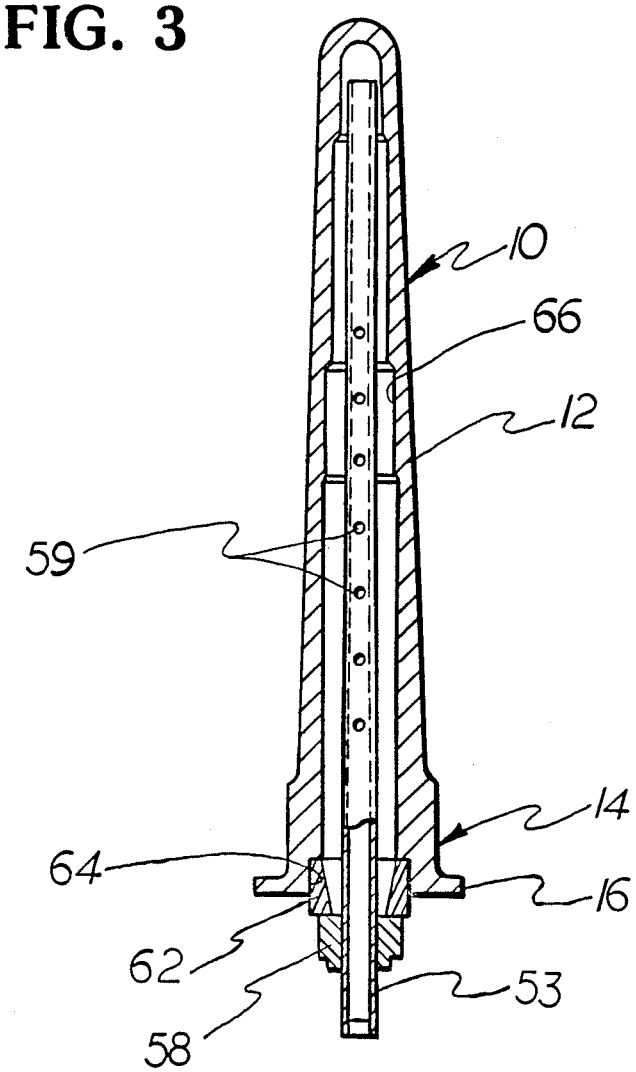
FIG. 3 is an axial cross-sectional view of the plunger with its cooling tube secured thereto.
Figure 4:
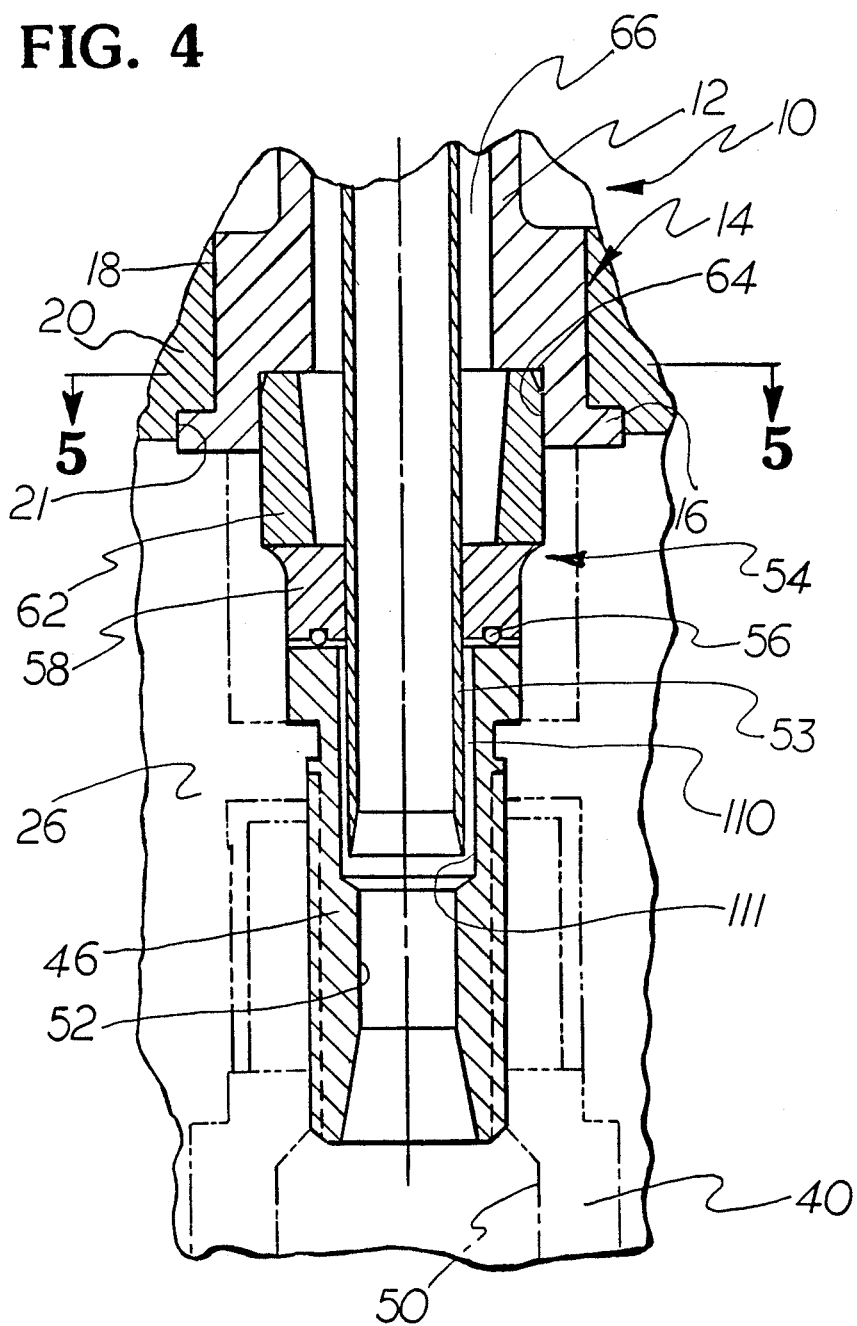
FIG. 4 is an enlarged view similar to that of FIG. 3 illustrating the lower portion of the adapter assembly secured to the reciprocating piston.

The plunger assembly includes a hollow plunger element 10 which has an elongated tapered upper or plunger portion 12 (FIG. 3) and a cylindrical bottom or base portion 14 which ends in an annular flange 16. The cylindrical base portion 14 is press fitted into a thru-bore 18 in the top wall of a plunger holder 20 (FIGS. 2 and 4). This thru-bore 18 is suitably recessed 21 to partially receive the annular flange 16 thereby defining the bottom surface of the plunger element 10 as a bearing surface. The plunger holder 20 is cylindrical in shape having an open bottom 24, which is partially closed by a pair of opposed, inwardly extending locking flanges 25.

The plunger assembly also includes an adapter 26 which has an upper portion above annular support collar 27. The upper portion has a cylindrical body 28 which has a pair of opposed increased diameter portions 29 which define an outer diameter corresponding to the inner diameter of the plunger holder opening 24. These increased diameter portions 29 are discontinued at diametrically opposed locations to reduce the outer diameter of the upper portion sufficiently to permit the lowering of the plunger holder over the upper portion of the adapter when the locations of these reduced diameter portions corresponds to the locations of the locking flanges 25. When the plunger holder is fully lowered, the bearing surface of the plunger base will engage the upper surface X of adapter 26.

The distance between the plunger bearing surface and the upper surface of these locking flanges 25 corresponds to the vertical height of the increased diameter portions 29 so that when the plunger holder 20 is fully lowered onto surface X of the adapter 26, the plunger holder can be rotated 90° to locate the locking flanges 25 between these increased diameter portions 29 and the adapter collar 27, thereby preventing vertical separation of the plunger holder and the adapter. An opposed pair of detents 30, which are biased outwardly through detent apertures 33 (FIG. 2) by a spring 31 contained within a suitable groove 32 in the plunger adapter and which enter recesses 34 in the plunger holder when so rotated, prevent the unintentional rotation of the plunger holder 20 relative to the adapter 26. There are four recessed; two to locate to retain adapter in position and two to adapter for removal. To join these pieces together by locating the detents in their associated recesses 34 or to release them, a tool (not shown) can be used which has opposed keys for engaging opposed holder slots 35. A pair of notches 34a are cut in the inner wall of the holder at the bottom to cam the detents inwardly as the plunger holder is lowered onto the adapter.

To join the plunger assembly to the vertically reciprocating piston 40, the bottom of the adapter has an upwardly extending threaded bore 42 which threads onto a threaded portion 43 on the top of the piston 40. The adapter may, if desired be one piece with the piston 40. A hex opening 41 permits the use of a hex head tool to thread the adapter onto the piston. To lock these members together, a bolt 46 extends downwardly through the hex opening 41 in the adapter and is threadedly received by a threaded bore 48 in the top portion of the piston 40.

Figure 1:
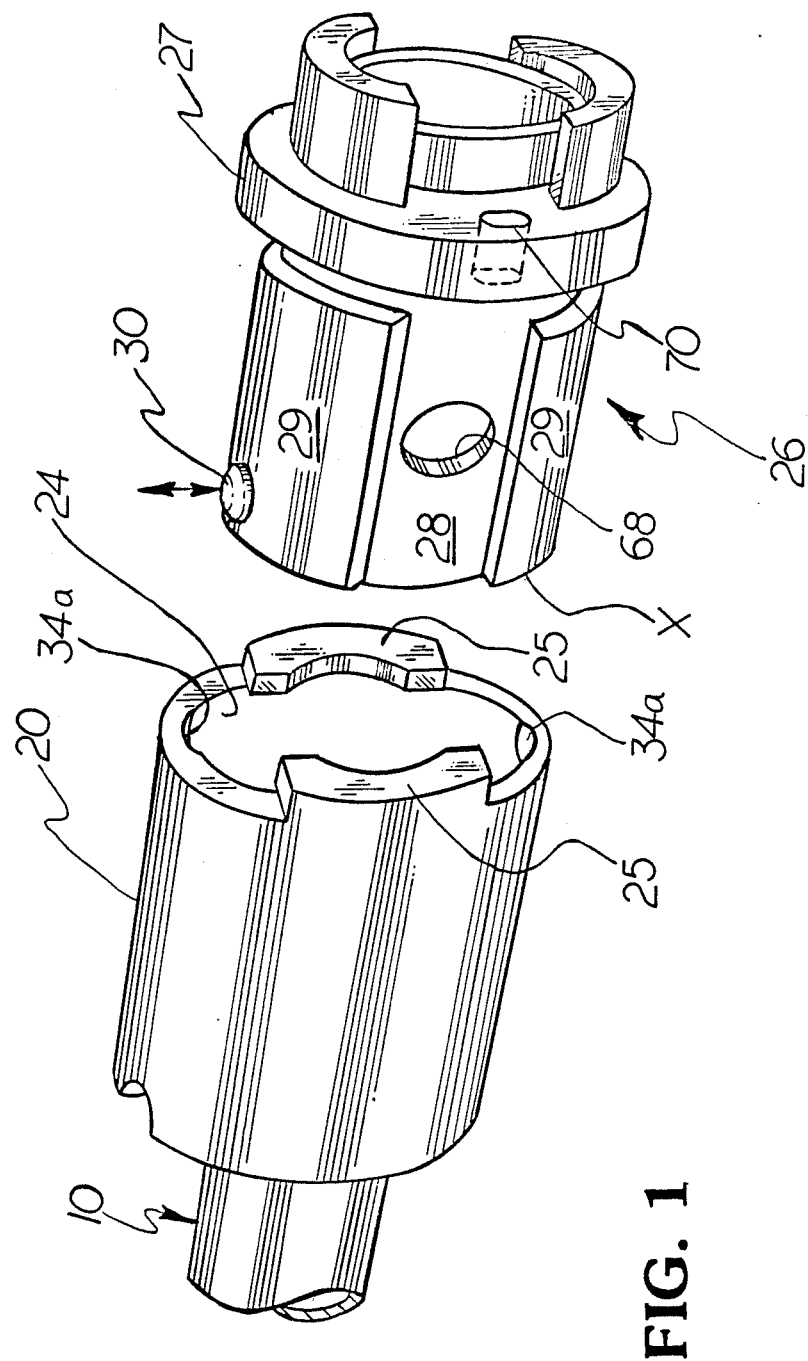
FIG. 1 is an oblique, exploded view of the plunger, the plunger holder and adapter of the plunger adapter assembly made in accordance with the teachings of the present invention.
Figure 5:
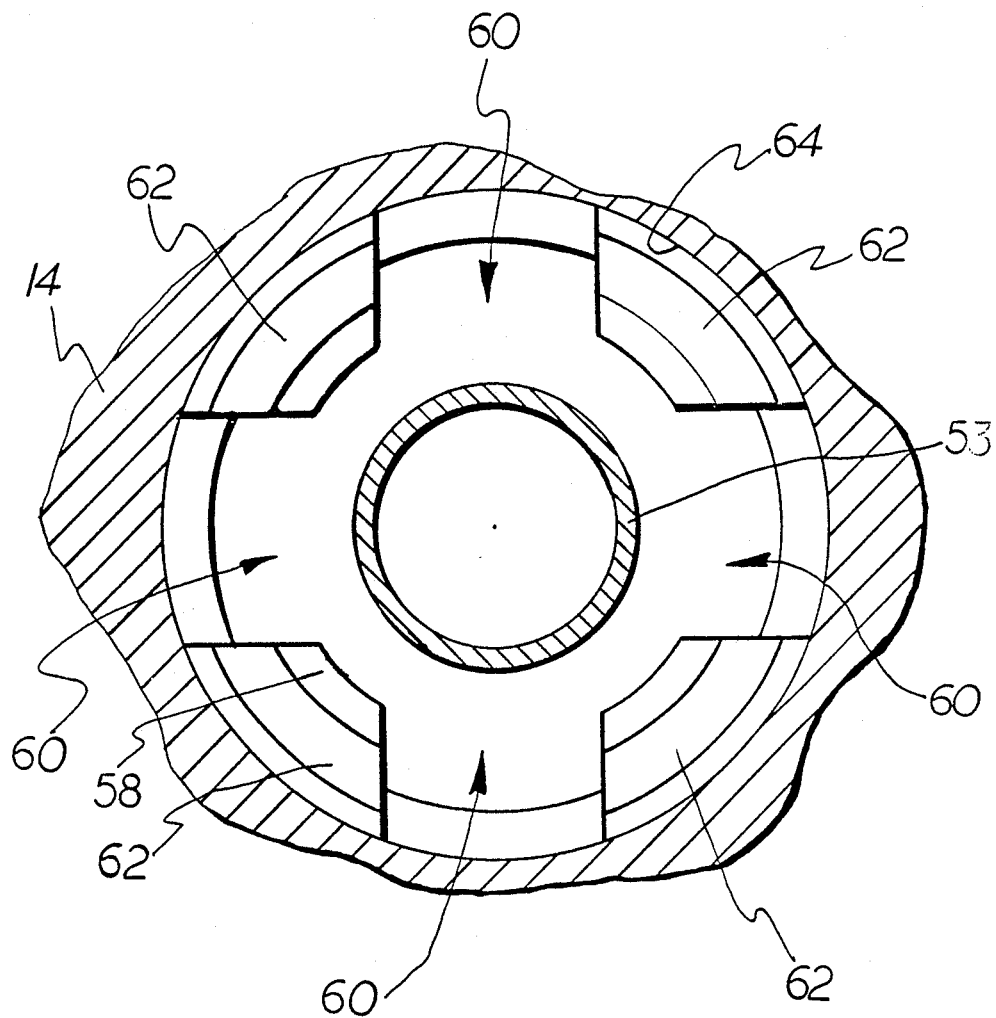
FIG. 5 is a view taken along the lines 5—5 of FIG. 4.

Cooling air is supplied upwardly through the center hole 50 of the piston 40 (FIG. 4), through the center hole 52 of the locking bolt 46 and then through the elongated tube 53 of the cooling tube assembly 54 (an "O" ring 56 effects a seal between the locking bolt 46 and the annular collar 58 of the cooling tube assembly to which the cooling tube is secured) and out holes 59 in the cooling tube. This air flows downwardly along the plunger and outwardly through the openings 60 (see FIG. 5) between four wedge elements 62 of the cooling tube assembly, which are integral with the annular collar 58 and which are wedgingly received within a recess 64 defined at the entrance of the plunger opening 66 to secure and maintain the cooling tube in precisely centered position within the plunger throughout the operation of the plunger assembly. Since the air has been heated, it has a greater volume than the inleted air. Accordingly, the size of this collective opening 60 should be at least two and one half times larger than the area of the cooling tube 53. The exhausted, heated air passes through opposed holes 68 (FIG. 1) in the adapter upper portion and flows downwardly through the channels formed between the enlarged diameter sections 29, the upper body 28 and the plunger holder 20 through holes 70 in the annular adapter support collar and into the plunger housing assembly 72 (FIG. 2).

Figure 6:
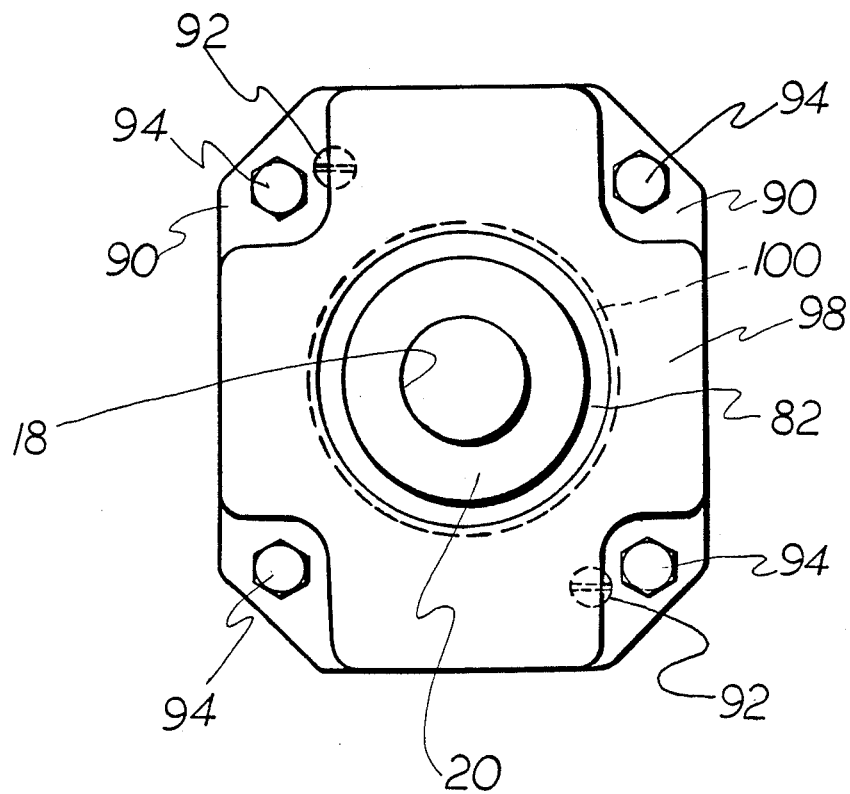
FIG. 6 is a top view of the float cover of the plunger assembly.

When the piston 40 is lowered, the lower surface of the adapter annular support collar 27 engages a spacer 80 which is supported at the bottom of the centering sleeve 82. Further downward displacement results in the centering sleeve 82 forcing the kickback basket 84 downwardly compressing the kickback spring 86 which is located between the kickback basket and the spring retainer 88. The upper position of the kickback basket 84 is defined by the plunger assembly cap 90 which is secured by screws 92 (see FIG. 6) to a retainer plate 93 (the joined cap 90 and retainer plate are secured via bolts 94 to the cylinder housing (not shown)). (In this regard, prior to installation, the retainer plate 93 is lifted upwardly from the bottom of the spring retainer 88 until locating pins 95, which extend outwardly from the spring retainer, enter cutouts 96 in the retainer plate 93 preventing further upward movement.)

A float cover 98 having a depending central collar 100 is located on top of the cap 90 with the collar 100 being located within the central opening 102 in the cap. To prevent the float cover 98 from coming off the cap, a pair of screws 104 are screwed into suitable apertures 106 in the cap. The screw heads are located within opening 108 in the float cover which are substantially larger than the screw heads, thereby permitting the float cover to move horizontally relative to the screws 104.

Selected float clearances are defined in the plunger assembly: a float clearance 110 (FIG. 4) between the cooling tube 53 and the locking bolt thru-bore section 111 adjacent the cooling tube; a float clearance 110a between the adapter outer diameter (including the outer surface of the detents) and the adjacent plunger holder (including the detent recesses); and a float clearance between the outer diameter of the depending collar 100 of the float cover 98 and the inside diameter of the cap 90. As a result, when the piston 40, and hence, centering sleeve 82 are conjointly raised, the upper chamfered edge 83 of the centering sleeve, which may be slightly out of alignment with the neck ring assembly 120, will engage a side portion of the neck ring assembly opening 122. At this time, the centering sleeve will be located between the plunger holder and the floating cover both of which have substantial axial length. This sandwiching of the centering sleeve prevents its deflection when it engages the neck ring assembly. Further upward movement will shift the centering sleeve 82 (which has the ability to move laterally without any hindrance), and hence, the plunger holder 20 (and cooling tube 53) relative to the integral piston 40 and adapter 26 until the plunger 10 is in alignment with the neck ring assembly 120. In the preferred emobodiment, the float clearances between the plunger holder and adapter, and between the cooling tube and locking bolt are defined to be 0.063", and the float clearance between the float cover and end cap is selected to be between 0.016" to 0.063" as desired, thereby defining the desired float clearance which can be as large as the present float clearance between the holder and adapter, and between the cooling tube and locking nut.

We claim:

1. A plunger mechanism for use in a glassware forming machine comprising:
   a hollow plunger having an elongated tapered portion and a base portion having an outwardly extending flange and an internal recess,
   a plunger holder including,
     a hollow cylindrical housing including means for receiving the flange of the base portion of said plunger,
   an adapter assembly including a cylindrical body means for insertion into the cylindrical housing of said plunger holder, said cylindrical body means having an outer diameter which will provide a predetermined float clearance between said plunger holder and said cylindrical body means,
   a vertically displaceable hollow piston,
   means for threadedly securing said adapter assembly to said piston including a locking bolt having a vertical bore extending therethrough,
   cooling tube means including an upper perforated section for insertion into said hollow plunger and a lower tube section for insertion into said locking bolt bore, said lower tube section including external wedge means for insertion into the internal recess of the base portion of said plunger, and said locking bolt bore having an inner diameter which will provide a predetermined float clearance between the lower tube section and the vertical locking bolt bore,
   a casing including,
     a cylindrical kick-up basket having an inwardly extending bottom flange,
     spring retainer means having a cylindrical upper cap means with a lower surface for stopping upward displacement of said kick-up basket, said cap means having an upper surface and an inner bore extending therethrough,
     cylindrical guide sleeve means for insertion into said kick-up basket and supported on said kick-up basket bottom flange, said sleeve means having an internal diameter for matingly receiving the plunger holder,
     cylindrical cover means supported on the upper surface of the cap means and having a downwardly extending collar located within the inner bore of the cap means and defining an inner bore for matingly receiving said sleeve means, said collar having an outer diameter which will define a predetermined float clearance between said float cover means collar and said cap means inner bore,
   the float clearance between said lower tube section and said locking bolt bore, and between said plunger holder and said cylindrical body means being at least as large as the float clearance between said float cover means collar and said cap means inner bore so that as said sleeve means is vertically displaced to engage and enter a neck ring assembly, said sleeve means and said plunger holder can float relative to said adapter assembly until said sleeve means, and hence, said plunger holder are properly centered relative to the neck ring assembly.

2. A plunger mechanism according to claim 1, wherein said cylindrical body means of said adapter assembly includes detent means, and means for biasing said detent means outwardly to a fully advanced position, and the cylindrical housing of said plunger holder includes internal recess means associated with each of said detents, said recess means having a predetermined depth so that the same float clearance will be present between said advanced detents and said recess means as exists between said plunger holder and said cylindrical body means.

3. A plunger mechanism according to claim 2, further comprising means for preventing vertical displacement of said float cover means from the upper surface of said cap means while permitting horizontal displacement.

* * * * *